(12) United States Patent
Blümel et al.

(10) Patent No.: US 7,409,904 B2
(45) Date of Patent: Aug. 12, 2008

(54) BAKING OVEN

(75) Inventors: Frank Blümel, Mönchsroth (DE);
Bernd Dannenhauer, Dinkelsbühl (DE);
Dieter Knost, Dinkelsbühl (DE); Rudolf Fiedler, Langfurth (DE); Thomas Schmidt, Martinsheim (DE)

(73) Assignee: Werner & Pfleiderer Lebensmitteltechnik, Dinkelsbuhl (DE)

( * ) Notice: Subject to any disclaimer, the term of this patent is extended or adjusted under 35 U.S.C. 154(b) by 806 days.

(21) Appl. No.: 10/874,752

(22) Filed: Jun. 24, 2004

(65) Prior Publication Data

US 2005/0183586 A1 Aug. 25, 2005

(30) Foreign Application Priority Data

Jun. 26, 2003 (DE) .................. 103 28 631

(51) Int. Cl.
*A47J 37/04* (2006.01)
*A21B 1/46* (2006.01)

(52) U.S. Cl. .............. 99/427; 99/477; 99/479; 99/474

(58) Field of Classification Search ............ 99/427, 99/479, 478, 477, 472, 421 P, 421 H, 473, 99/474

See application file for complete search history.

(56) References Cited

U.S. PATENT DOCUMENTS 1,491,689 A 4/1924 Gantvoort
1,776,501 A * 9/1930 Grady .................. 99/339
1,827,134 A * 10/1931 Becker ................. 99/427
3,074,360 A * 1/1963 Vaughan ............... 432/141
4,574,689 A * 3/1986 Robertson .............. 99/337
5,417,148 A * 5/1995 Cavallo ................. 99/334
5,704,278 A * 1/1998 Cross ................... 99/427
5,767,487 A * 6/1998 Tippmann .............. 219/440

FOREIGN PATENT DOCUMENTS

DE 25 17 827 11/1976
DE 3012043 C2 10/1981
DE 203 02 326 U1 5/2003

* cited by examiner

*Primary Examiner*—Reginald L Alexander
(74) *Attorney, Agent, or Firm*—Browdy and Neimark

(57) ABSTRACT

A baking oven comprises a feeding portion having a feeding aperture for introducing dough pieces, a baking chamber and a discharge portion having a discharge aperture for removing dough pieces. In addition, a circulating air unit is provided which comprises a circulating air source generating a circulating air flow, a circulating air heating means and a circulating air guiding channel a part of which is formed by the baking chamber. A plurality of receptacles for dough pieces are mounted in the baking chamber to be freely rotatable or pivotable around a horizontal rotation or pivot axis. The rotation or pivot axes of the receptacles are located higher than the centre of gravity of the receptacles even if the receptacles are filled with dough pieces. As a result, a baking oven is provided in which the dough pieces can be distributed as evenly as possible and moved along during the baking process.

26 Claims, 8 Drawing Sheets

BAKING OVEN

BACKGROUND OF THE INVENTION

1. Field of the Invention

The present invention relates to a baking oven comprising a feeding portion having a feeding aperture for introducing dough pieces, a baking chamber comprising at least one receptacle for dough pieces, a discharge portion having a discharge aperture for removing dough pieces, a circulating air unit comprising a circulating air source generating a circulating air flow, a circulating air heating means and a circulating air guiding channel a part of which is formed by the baking chamber.

2. Background Art

Such baking ovens have been disclosed by prior public use. However, such baking ovens can still be improved with respect to the baking time of the dough pieces and ease of operation.

SUMMARY OF THE INVENTION

It is an object of the present invention is therefore to further develop a baking oven of the type described at the beginning such that shorter baking periods can be realized while at the same time the baking oven should be easier to operate.

According to the invention, this object is attained by means of a baking oven comprising a plurality of receptacles for dough pieces, which receptacles are mounted in the baking chamber to be freely rotatable or pivotable around a horizontal rotation or pivot axis such that the rotation or pivot axis of the receptacles is located higher than the centre of gravity of the receptacles even if the receptacles are filled with dough pieces.

According to the invention, it has been found that dough pieces can be baked more efficiently if they are moved along in a circulating air flow on the one hand and distributed in the baking chamber as evenly as possible on the other. The receptacles' centre of gravity is located such that the receptacles can be suspended to be freely rotatable or pivotable.

According to an embodiment the at least one receptacle and thus the dough pieces can be automatically moved along in a circulating air flow by means of a drive unit. Their rate of motion can be adjusted by appropriately controlling the drive unit.

Another improvement comprises a plurality of receptacles for one dough piece each, wherein each receptacle preferably comprises a holding basket which is rotatably or pivotally mounted and open at one side. Such receptacles ensure that each dough piece will necessarily assume a certain position, whereby the dough pieces can be optimally distributed in the baking chamber in a predetermined manner. Holding baskets, which are particularly suitable for this purpose, can ensure good air circulation if they are made e.g. of an appropriate mesh. Alternatively, holding baskets without air circulation openings can be used to influence the baking result in a desired way.

If the receptacles are divided into and rigidly interconnected to groups and if the receptacles of a group are mounted such that they are jointly rotatable, the dough pieces can be separated from one another in the receptacles in a constructionally relatively simple manner. A common supporting frame for receiving the holding baskets of the group, which can preferably be used, simplifies the design of the groups even further. The supporting frame is pivotally mounted. Preferably the frame can be made of aluminum in order to reduce the receptacles' weight.

Receptacles according to an embodiment which comprises a plurality of receptacles for a plurality of dough pieces each, wherein each receptacle is rotatably or pivotally mounted, are easy to construct.

An embodiment of the baking oven comprising a vacuum pump which is connected to the baking chamber and can be activated in a controlled manner in order to realize a predetermined negative pressure in the baking chamber facilitates heating-up of the baking chamber at the beginning of a baking process. Alternatively or additionally, a vaporization means which is connected to the baking chamber and can be activated in a controlled manner in order to supply vapour into the baking chamber can be provided for moisturizing the dough pieces in a controlled manner, thus improving the baking result. If the vaporization means is used in conjunction with the vacuum pump, the baking result is improved even further since the dough pieces can in this case be moisturized more evenly.

Constructionally simple means can be used for the drive unit to cause the receptacles to rotate around a horizontal rotation axis.

According to a further improvement of the baking oven an outer and/or an inner delimiting wall of the baking chamber, between which the receptacles are arranged, are/is provided with circulating air openings. Such circulating air openings improve the dough pieces' contact with circulating air.

According to another preferred embodiment a closable dough piece opening for dough pieces is arranged in an outer delimiting wall of the baking chamber, which dough piece opening interacts with either the feeding aperture or the discharge aperture for introducing or removing dough pieces, depending on the position of rotation of the outer delimiting wall. This dough piece opening simplifies the construction of the outer delimiting wall since the latter needs to be provided with just one opening, which can be used for introducing as well as removing dough pieces.

Additionally, the baking oven may comprise a baking oven feeding door which is preferably arranged above the baking chamber and which is moveable by means of an actuator between a baking position, in which the feeding portion is closed by the baking oven feeding door, and a feeding position, in which dough pieces can be introduced via the feeding portion, and/or a baking oven discharge door, which is preferably arranged below the baking chamber and which is moveable by means of an actuator between a baking position, in which the discharge portion is closed by the baking oven discharge door, and a discharge position, in which dough pieces can be removed via the discharge portion. Moveable doors make the baking oven easier to operate. The dough pieces can be transported under gravity if a feeding door of the baking oven is arranged above the baking chamber and a discharge door of the baking oven is arranged below the baking chamber.

Controlled movement of a baking chamber feeding door, a baking chamber discharge door and a dough piece opening, which can be predetermined by means of a central control unit of the baking oven, enables the baking process realized by means of the baking oven to be fully automated.

According to yet another embodiment the drive unit interacts with at least one flexible, continuous driveline to which the receptacles are attached, which driveline is guided by means of a guide means and driven by means of the drive unit such that it circulates along a closed path, thus moving along the receptacles. Such a preferred baking oven can in particular also be designed in a visually attractive manner, which is advantageous if the baking oven is used in a shop. In addition, the aforesaid drive arrangement can be designed in a robust and operationally safe manner.

A preferred driveline designed as a driving chain which is engaged by a driving pinion of the drive unit is easy to construct.

A preferred drive arrangement with receptacles which are mounted between a pair of circulating drivelines which are guided symmetrically to one another, wherein at least one of the drivelines is driven, can even be used for relatively long receptacles.

A preferred guide means which comprises a plurality of deflection pulleys and/or a plurality of guiding rails for the at least one driveline ensures that the receptacles are reliably guided.

According to a further embodiment the baking oven comprises a retaining means for pivoting the receptacles around their rotation or pivot axis which retaining means preferably comprises a retaining bolt, which is introducable, i.e. moveable into a retaining position, and retractable into an inoperative position in a controlled manner and, in the retaining position, interacts with a counterpart of the receptacle for pivoting the receptacle and, in the inoperative position, does not interfere with the motion path of the counterpart during the movement of the receptacles. The retaining means is easy to construct and enables the receptacles to be emptied in a reliable, controlled manner.

Details of the invention will become apparent from the ensuing description of exemplary embodiments of the invention, taken in conjunction with the drawing.

DESCRIPTION OF THE PREFERRED EMBODIMENTS

Figure 1:
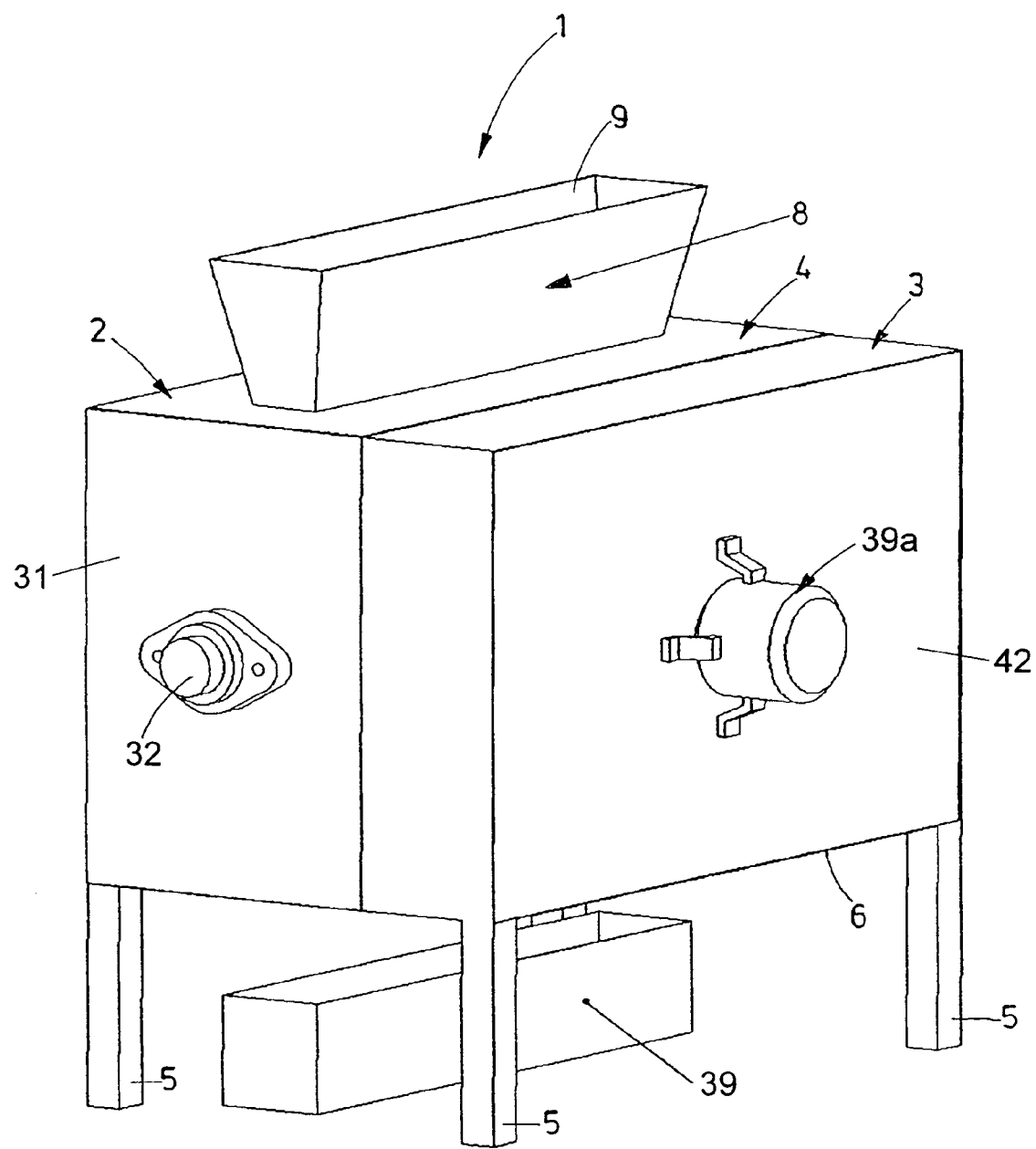
FIG. 1 shows a perspective view of a baking oven.
Figure 2:
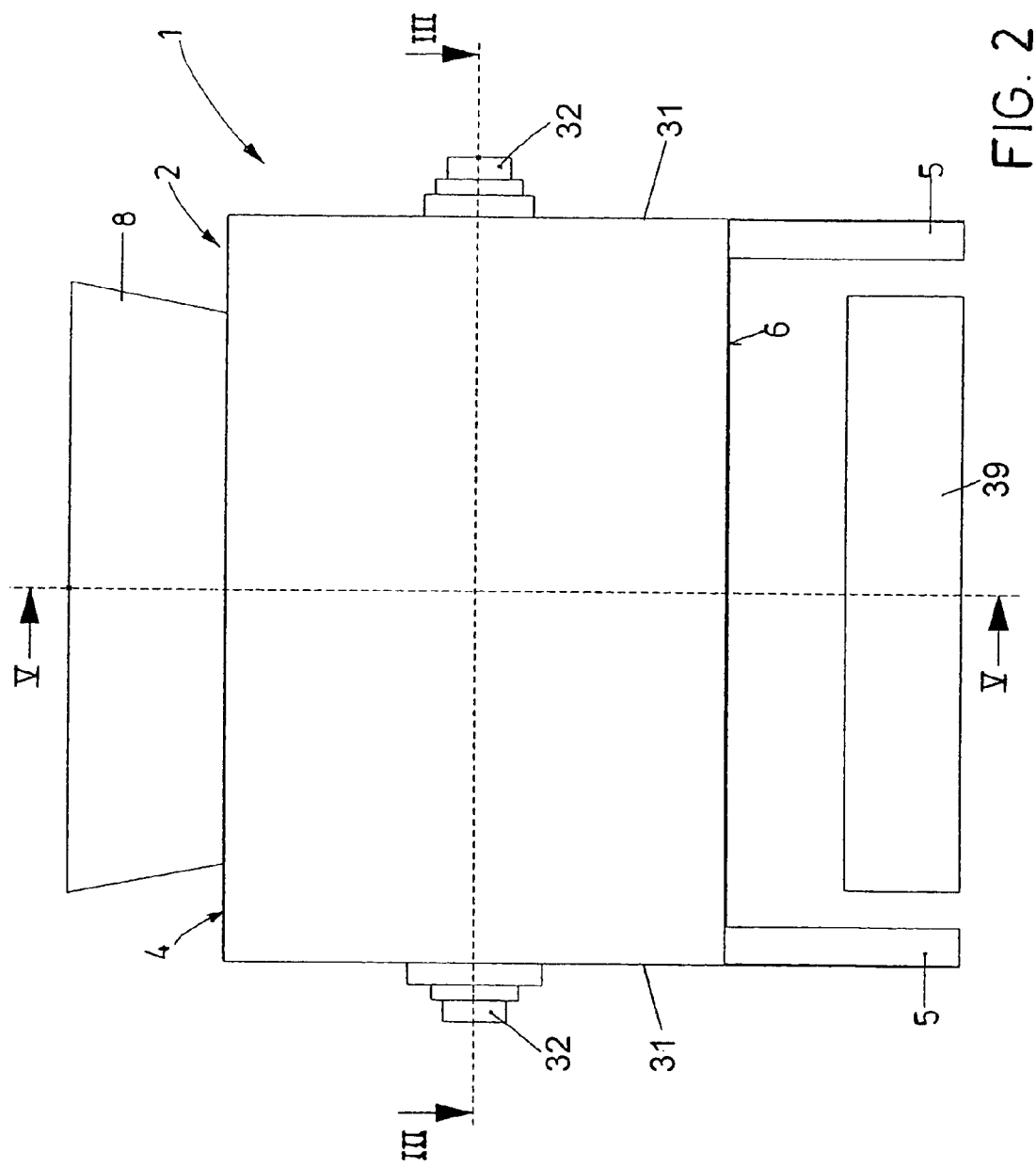
FIG. 2 shows a side view of the baking oven of FIG. 1.

FIGS. 1 to 5 show a first embodiment of a baking oven 1. Said baking oven comprises a cuboid outer housing 2 which is divided into a circulating air source housing 3 and a baking chamber housing 4. The outer housing 2 is supported on four feet 5 such that a bottom 6 of the outer housing 2 is spaced from the floor contact surface of the feet 5.

Figure 3:
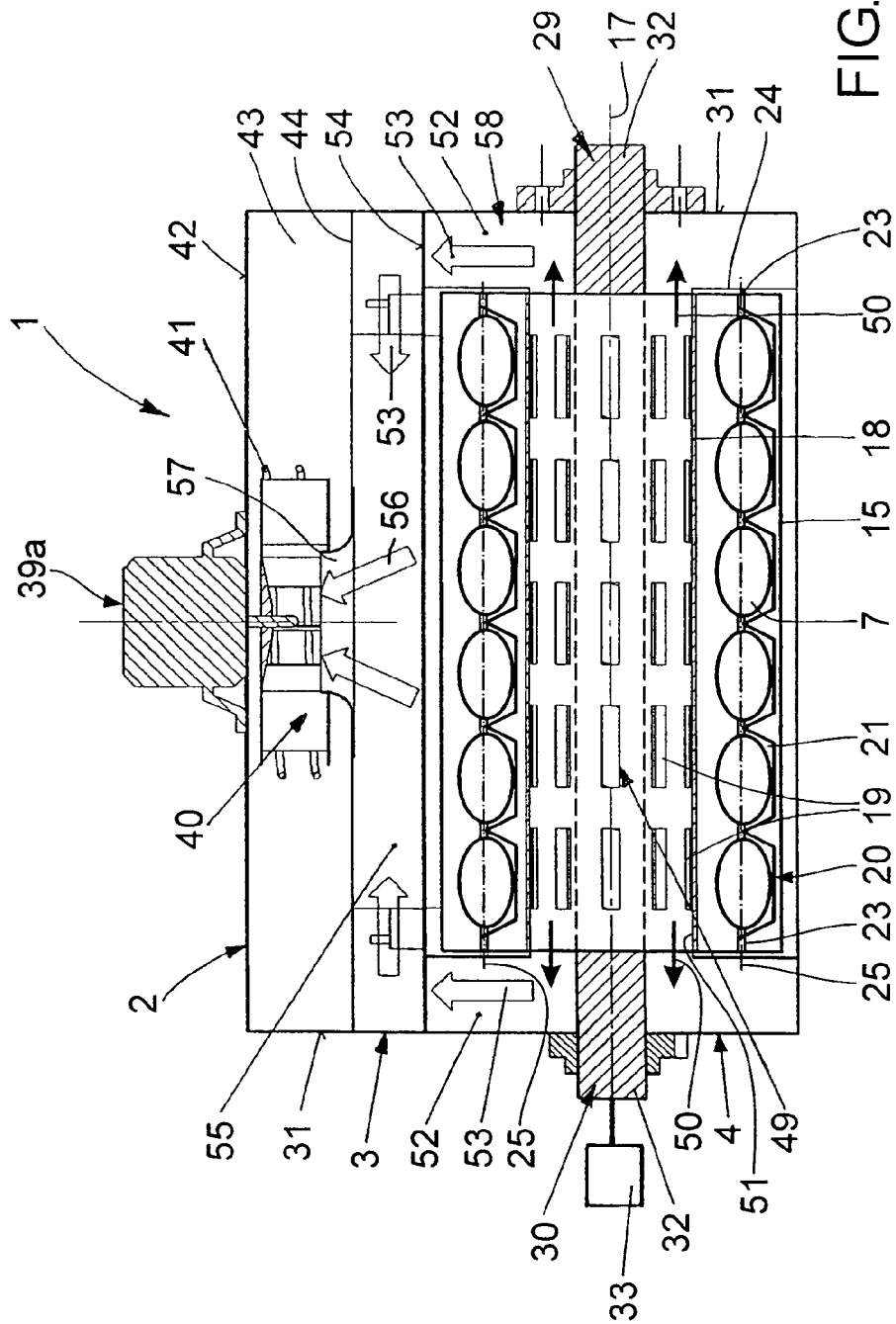
FIG. 3 shows a section along the line III-III in FIG. 2.

Dough pieces 7, which are shown e.g. in FIG. 3, e.g. frozen, initially baked rolls, are introduced in the baking oven 1 via a feeding hopper 8 having a rectangular inlet 9 and via a feeding aperture 10. The feeding hopper 8 is arranged on top of the baking chamber housing 4.

Figure 4:
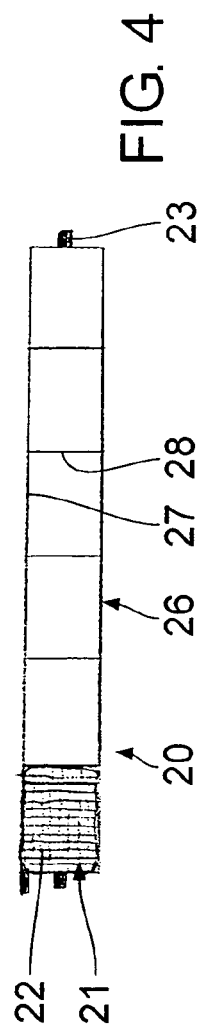
FIG. 4 shows a plan view of a group of receptacles for dough pieces, wherein five of six holding baskets are omitted.
Figure 5:
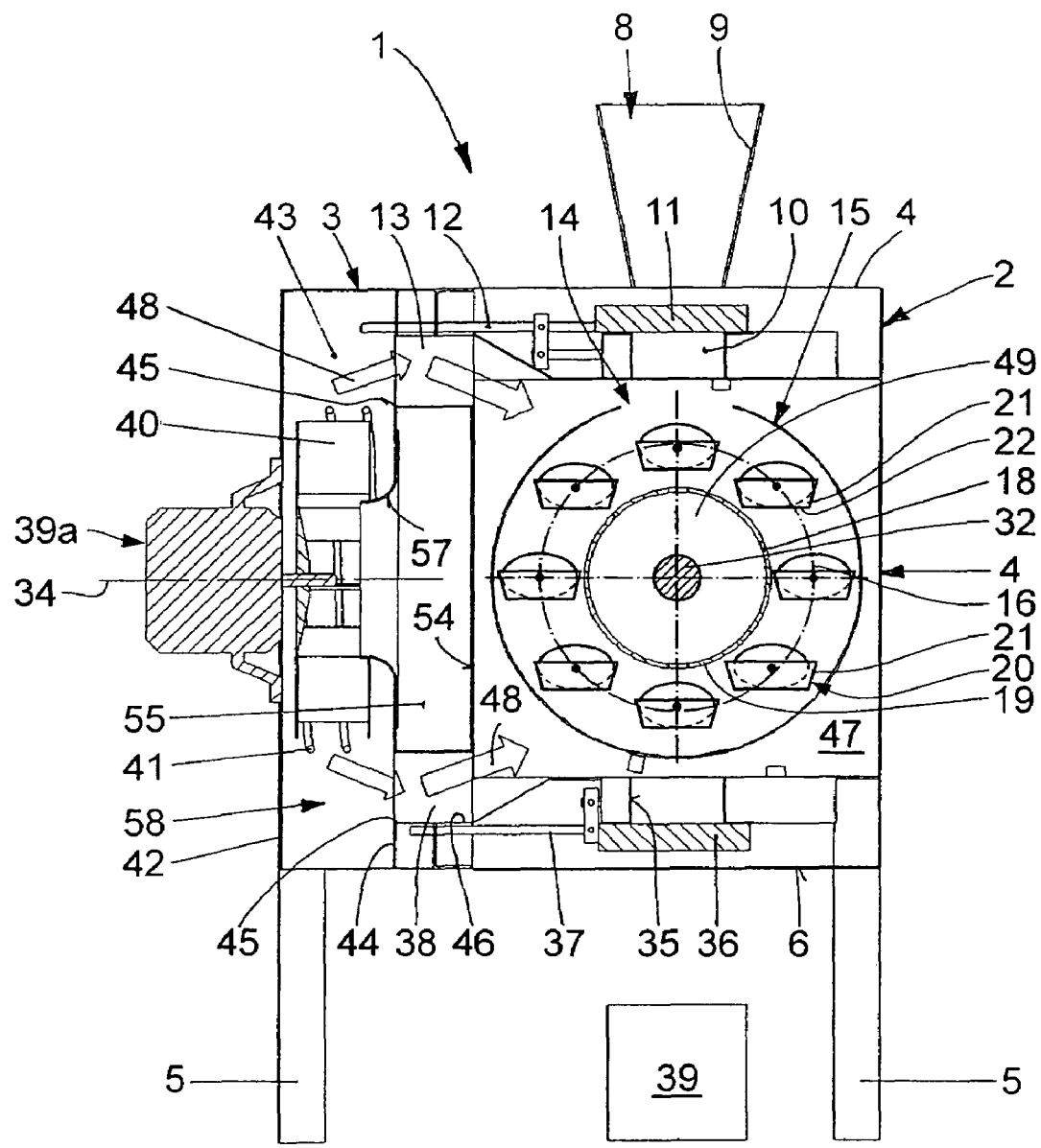
FIG. 5 shows a section along the line V-V in FIG. 2.

FIGS. 3 to 5 show details of the interior of the baking oven 1. The feeding aperture 10 can be closed by means of a feeding slide 11 supported thereon which acts as a feeding door of the baking oven. For this purpose, an actuator 13, which is schematically outlined e.g. in FIG. 5, axially displaces a first actuating rod 12 which is connected to and horizontally extends from the feeding slide 11.

FIG. 5 shows the feeding slide 11 in a baking position, in which the feeding aperture 10 is closed by the feeding slide 11. In a feeding position (not shown), the feeding slide 11 is horizontally displaced relative to the baking position, thus enabling dough pieces 7 to be introduced via the feeding aperture 10.

In the feeding position of the baking oven 1, the feeding aperture 10 is flush with a slot-like opening 14 in a drum-shaped outer delimiting wall 15 of a baking chamber 16 of the baking oven 1. The outer delimiting wall 15 is rotationally symmetrical relative to a rotation axis 17. The baking chamber 16 is delimited towards the inside by a drum-shaped inner delimiting wall 18 which is arranged coaxially with the outer delimiting wall 15. The outer delimiting wall 15 as well as the inner delimiting wall 18 are provided with rectangular openings 19 for circulating air supplied into the baking chamber 16. Alternatively, the delimiting walls 15, 18 can be made of wire mesh. In a variant of the baking oven 1, the delimiting walls 15, 18 can be omitted; as a result, the dough piece receptacles described below move freely within the baking chamber housing 4.

The baking oven 1 comprises a total of eight groups 20 of receptacles 21 each of which is provided with six holding baskets 22 for one dough piece 7 each, which groups 20 are arranged in the baking chamber 16, i.e. the hollow, cylindrical space delimited by the outer delimiting wall 15 and the inner delimiting wall 18. More or less groups 20, e.g. ten groups 20, and holding baskets 22 per group 20, e.g. five holding baskets 22, are possible. Each group 20 can hold a total of six dough pieces 7 lined up along the rotation axis 17 of the delimiting walls 15, 18.

Each group 20 of receptacles 21 is secured to end walls 24, which extend beyond the end wall of the inner delimiting wall 18 up to the outer delimiting wall 15, via axial-radial bearings 23 such that each group 20 is rotatable around an individual, horizontal rotation axis 25 extending along the line of receptacles 21. The individual receptacles 21 are open at one side. The size of the holding baskets 22, especially their depth, is adapted to the shape and size of the individual dough pieces 7 such that the rotation axis 25 of the receptacles 21 is located higher than the centre of gravity of the receptacles 21 even if the latter are filled with dough pieces 7. The resuiting centre of gravity of a receptacle 21 containing a dough piece 7 is therefore situated between the bottom of the holding basket 22 and the rotation axis 25 of a group 20. The group 20 is therefore a suspended support for dough pieces 7.

FIG. 4 shows a single group 20 of receptacles 21, wherein five of the total number of six holding baskets 22 are omitted for the sake of clarity. Only the outermost left holding basket 22 is shown, which is made of wire mesh. Circulating air can therefore also circulate along those sides of the dough piece 7 which are in contact with the holding basket 22. The holding baskets 22 of a group 20 are supported on a common supporting frame 26 made of aluminum. The supporting frame 26 can also be made of other materials. Each holding basket 22 is inserted and held in a rectangular frame portion 27 of the supporting frame 26. The individual frame portions 27 are arranged directly adjacent to one another such that a crossbar 28 between two frame portions 27 delimits both these frame portions 27 at the same time.

FIG. 5 shows that the groups 20 moving around the central rotation axis 17 are always oriented such that the holding basket 22 is situated below the dough piece 7, thus carrying the latter. The aforedescribed orientation is due to the fact that the centre of gravity of the receptacles 21 containing the dough pieces 7 is located as described above and the groups 20 are secured via bearings.

The inner delimiting wall 18 and the outer delimiting wall 15 are driven independently of one another and are both rotatable around the central rotation axis 17. The figure shows the drive of the inner delimiting wall 18. The inner delimiting wall 18 is rotatably secured to side walls 31 located at opposite ends of the baking chamber housing 4 by means of two flange-mounted axial-radial bearings 29, 30. A driving shaft 32, which is non-rotatably connected to the inner delimiting wall 18, is driven by a driving motor 33.

Below the baking chamber 16, the baking oven 1 comprises a discharge aperture 35, which is arranged symmetrically to the feeding aperture 10 relative to a horizontal centre plane 34, and a discharge slide 36 closing the discharge aperture 35. The discharge slide 36 is moveable between a closed position shown in FIG. 5 and a discharge position, in which the discharge slide 36 does not cover the discharge aperture 35, by means of an actuator 38 and an associated actuating rod 37. The discharge slide 36, the actuating rod 37 and the actuator 38 are also arranged symmetrically to their counterparts allocated to the feeding aperture 10 relative to the centre plane 34. Below the outer housing 2, a container 39 for ready-baked dough pieces is arranged flush with the discharge aperture 35.

A heating means 39*a* comprising a driven fan rotor 40 surrounded by a heating spiral 41 is arranged at one side of the baking chamber 16 and acts as circulating air source of the baking oven 1. The fan rotor 40 and the heating spiral 41 are supported on a side wall 42 of the circulating air source housing 3. The circulating air generated by the fan rotor 40 first enters a first circulating air chamber 43 whose sides are defined by the side wall 42 and a first intermediate wall 44. Near the top of the outer housing 2 on the one hand and the bottom 6 on the other, the first intermediate wall 44 is provided with wall openings 45 which, via circulating air ducts 46, communicate the first circulating air chamber 43 with a heat-insulated internal space 47 inside the baking chamber housing 4, which space surrounds the baking chamber 16. The internal space 47 acts as a second circulating air chamber into which circulating air from the first circulating air chamber 43 flows, as indicated by the flow direction arrows 48 in FIG. 5. Subsequently, the circulating air enters the baking chamber 16 via the circulating air openings 19 in the outer delimiting wall 15 and continues into an inner, third circulating air chamber 49, which is delimited by the inner delimiting wall 18, via the circulating air openings 19 in the inner delimiting wall 18 and the openings in the holding baskets 22 (if there are such basket openings). In the third circulating air chamber 49, the circulating air first flows into opposite directions parallel to the rotation axis 17, as indicated by the flow direction arrows 50 in FIG. 3.

The circulating air then passes from the third circulating air chamber 49 into ducts 51 located between the inner delimiting wall 18 and the driving shaft 32 and enters fourth circulating air chambers 52 whose sides are defined by the side walls 31 and the end walls 24.

As indicated by the flow direction arrows 53, the circulating air subsequently flows into a fifth circulating air chamber 55 via ducts in a second intermediate wall 54 which is arranged adjacent to the outer delimiting wall 15. From the latter chamber, the circulating air returns to the fan rotor 40 via a circulating air duct 57 arranged centrally in the first intermediate wall 44, as indicated by the flow direction arrows 56.

There is a closed circulating air guiding channel 58 formed by the first circulating air chamber 43, the circulating air duct 46, the internal space 47, the circulating air openings 19, the baking chamber 16, the third circulating air chamber 49, the ducts 51, the fourth circulating air chamber 52, the fifth circulating air chamber 55 and the circulating air duct 57.

The baking oven 1 is operated as follows: A sufficient amount of dough pieces 7 is kept available in the feeding hopper 8 at all times in order to enable uninterrupted operation of the baking oven 1. The outer delimiting wall 15 is then rotated around the central rotation axis 17 until the opening 14 has reached its highest position in which it is located exactly below the feeding aperture 10, as shown in FIG. 5. When doing so, the inner delimiting wall 18, the end wall 24 and the groups 20 are co-rotated such that a group 20 is located exactly below the opening 14 if the opening 14 is in the aforedescribed position. Subsequently, this first group 20 aligned with the opening 14 is filled by opening the feeding slide 11 until each receptacle 21 of the group 20 is filled with one dough piece 7. In this way, the group 20 is filled with dough pieces 7 lined up along the central rotation axis 17.

Subsequently, the inner delimiting wall 18, e.g. in FIG. 5, is rotated further in a clockwise direction until the next group 20 of receptacles 21 has reached the position of the group 20 which has just been filled. Said next group 20, which is in the filling position now, is then filled. The aforedescribed process is repeated periodically until all eight groups 20 have been filled.

Both delimiting walls 15, 18 are then synchronously driven at the same angular velocity during the baking process. At the same time, the fan rotor 40 and the heating spiral 41 produce circulating air which flows through the baking chamber 16 along the flow path described above, i.e. via the circulating air guiding channel 58. As a result, the dough pieces 7 are baked under the influence of circulating air while the groups 20 rotate.

Once the baking process is finished, which may be e.g. after 12 to 15 minutes, the delimiting walls 15, 18 are first moved into a position in which the opening 14 is in a low position, i.e. exactly opposite the position shown in FIG. 5. In this step, the alignment of the opening 14 and the empty group 20 is maintained. Subsequently, only the inner delimiting wall 18 is periodically rotated such that a filled group 20 is allocated to the opening 14 each time. In order to empty the receptacles 21 in the area adjacent to the discharge slide 36, the respective group 20 is caused to tilt around its individual rotation axis 25 by means of a retaining means (not shown in FIGS. 3 to 5) which is introduced in the baking chamber 16. As a result, the dough pieces 7 fall out of the holding baskets 22 of this group 20 into the container 39 for ready-baked dough pieces via the opening 14 and the open discharge slide 36.

The baking process, especially the fan rotor 40, the driving motor 33, the actuators 13, 38 and the drive (not shown) of the outer delimiting wall 15, is/are controlled by a central control unit (not shown) of the baking oven 1 according to a baking program.

Another embodiment of a baking oven will now be described with reference to FIGS. 6 to 8. Components corresponding to those discussed above in connection with FIGS. 1 to 5 have the same reference numerals and will not be explained in detail again.

Figure 6:
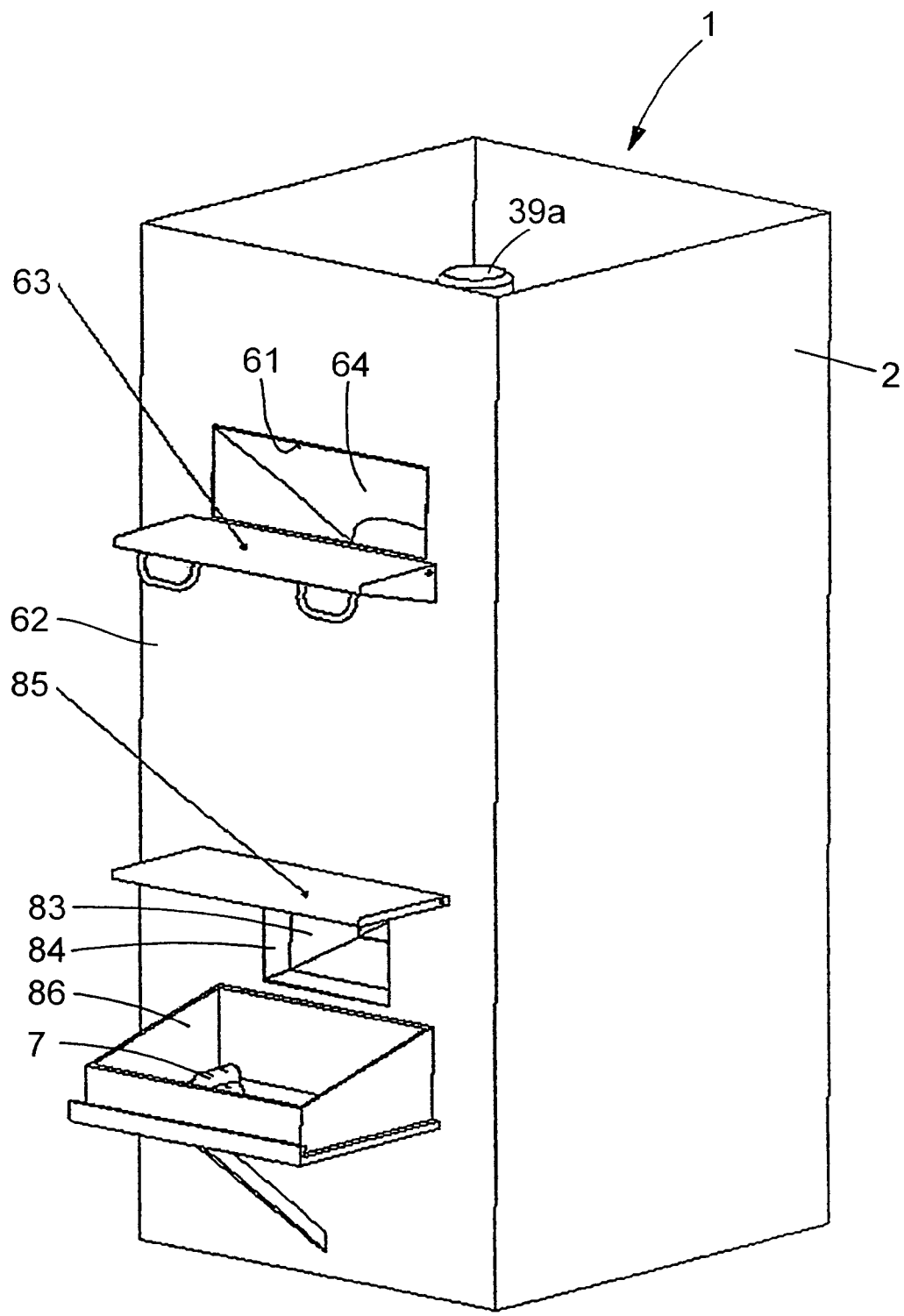
FIG. 6 shows a perspective view of another embodiment of a baking oven.
Figure 7:
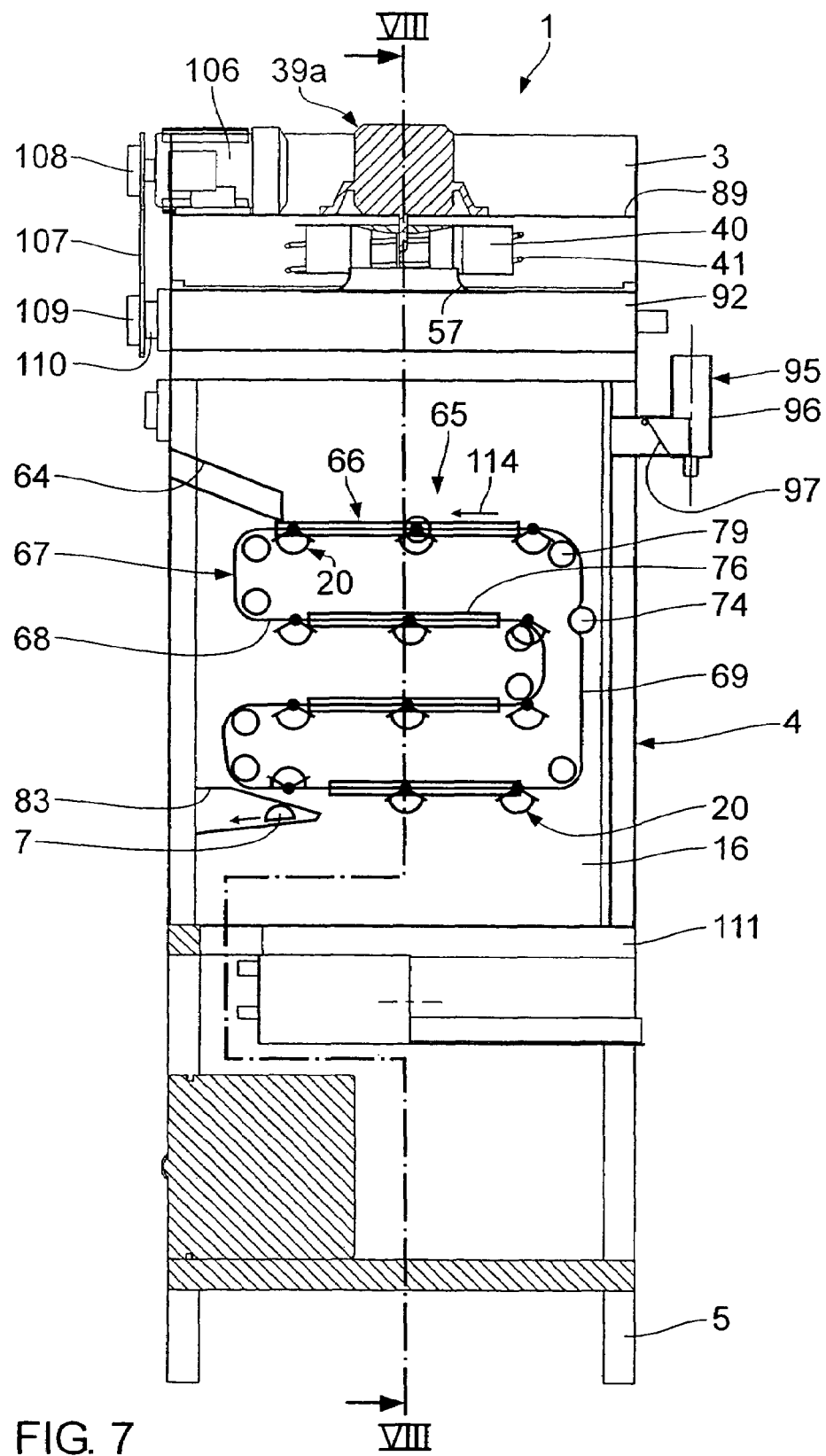
FIG. 7 shows a section, similar to that of FIG. 5, of a baking oven embodied according to FIG. 6 whose outer housing has been removed.
Figure 8:
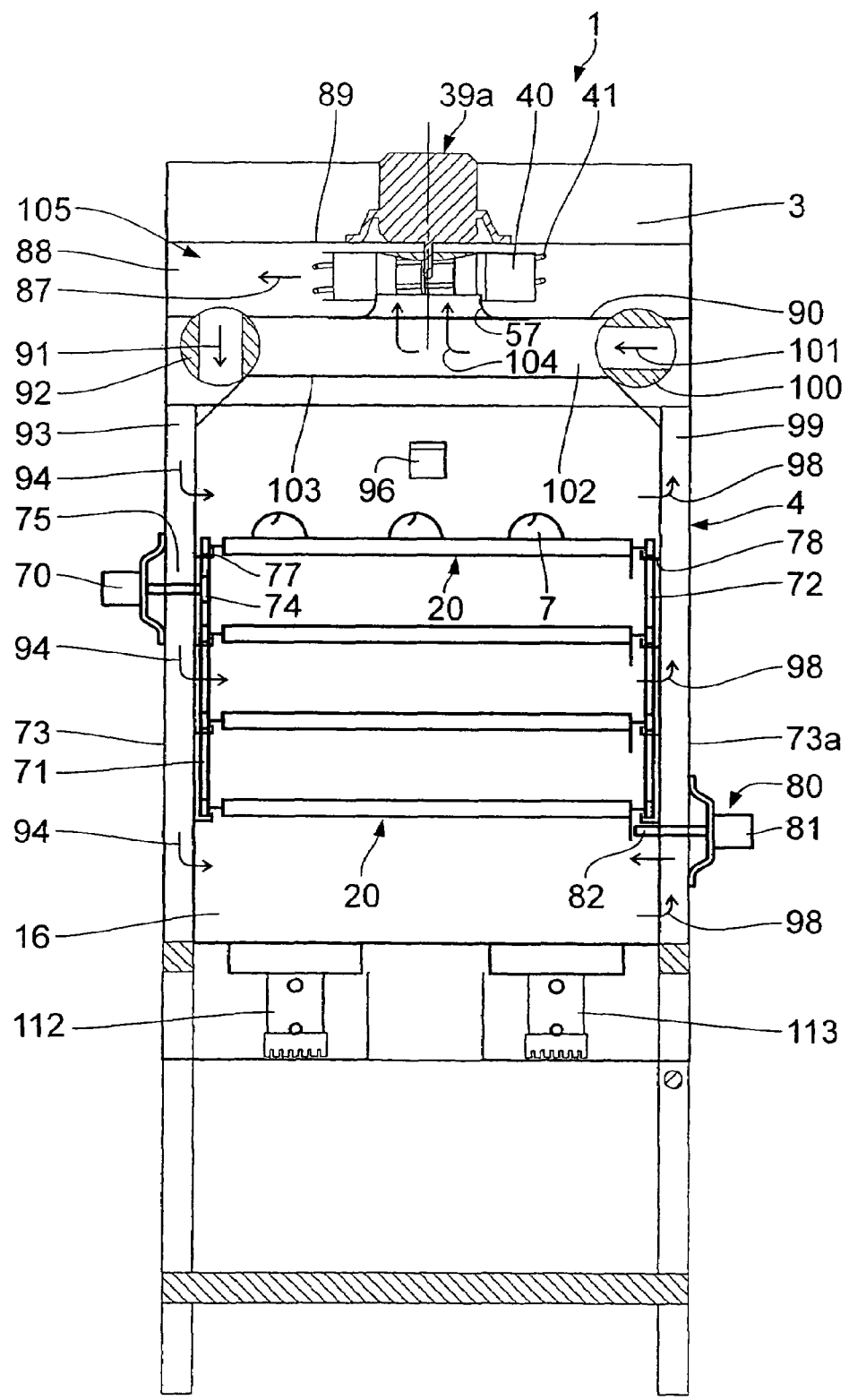
FIG. 8 shows a section along the line VIII-VIII in FIG. 7.

The baking oven 1 according to FIGS. 6 to 8 comprises a rectangular feeding aperture 61 for dough pieces 7 instead of a feeding hopper. The feeding aperture 61 is arranged in the upper portion of a side wall 62 of the outer housing 2 of the baking oven 1 and can be closed by means of a feeding door 63 which is pivotally linked to the side wall 62 below the feeding aperture 61. A downward feeding passage 64 is arranged downstream of the feeding aperture 61 inside the outer housing 2. The feeding passage 64 leads into the baking chamber 16 and ends above a receptacle/guide arrangement 65 arranged inside the baking chamber 16. The receptacle/guide arrangement 65 comprises a plurality of groups 20 of receptacles 21 for dough pieces 7, which groups are designed in the same way as described in connection with the embodiment shown in FIGS. 1 to 5. The groups 20 are moved by a guide means 66 along a closed motion path 67 comprising a substantially zigzag-shaped path portion 68 and a vertical path portion 69, as can be seen in the section shown in FIG. 7. The groups 20 move along due to the action of a driving motor 70. The force required to move the groups 20 along the motion path 67 is transmitted by means of two continuous driving chains 71, 72 acting as drivelines, which run parallel to one another and are arranged adjacent to two opposite side walls 73, 73a of the baking chamber housing 4. The bearing pins of the axial-radial bearings 23 of the groups 20 are rotatably supported in opposite chain links of the driving chains 71, 72. The driving chain 71 is engaged by a driving pinion 74 connected to the driving motor 70 via a driving shaft 75.

The continuous movement of the driving chains 71, 72 due to which the groups 20 move along the motion path 67 is guided by means of a plurality of guiding rails 76 of the guide means 66. For this purpose, the inner sides of the side walls 73, 73a are provided with four horizontal guiding rails 76 each, which are arranged on top of one another in a symmetrical manner. Free edge areas 77 of the guiding rails 76 are bent upwards by 90° such that the guiding rails 76 in conjunction with their respective side walls 73, 73a define guiding grooves 78 for the driving chains 71, 72. Along the motion path 67, each driving chain 71, 72 is deviated by means of eight deflection pulleys 79 which are also part of the guide means 66.

A retaining means 80 is allocated to the lowermost path portion of the motion path 67. Said retaining means 80 comprises an actuator 81 which is flange-mounted on the outside of the side wall 73a of the baking chamber housing 4 and can be operated magnetically. A horizontal retaining bolt 82 is connected to the actuator 81, which retaining bolt can be introduced in the baking chamber 16 by means of the actuator 81 through the side wall 73a.

In addition, a downward and outward discharge passage 83, which is flush with a discharge aperture 84 in the side wall 62, is allocated to the lower-most path portion of the motion path 67. The discharge aperture 84 can be closed by means of a discharge door 85 which is pivotally linked to the side wall 62 above the discharge aperture 84. Below the discharge aperture 84, a container 86 for ready-baked dough pieces 7 is attached to the side wall 62.

Circulating air generated by the fan rotor 40, which in the embodiment according to FIGS. 6 to 8 is arranged above the baking chamber 16, circulates around the dough pieces 7 while they move along within the baking chamber 16. FIG. 8 shows a first flow path along which the circulating air produced flows through the baking chamber 16 in the baking chamber housing 4.

As indicated by a flow direction arrow 87, the circulating air produced first passes through a first circulating air chamber 88 which is formed between a first intermediate bottom 89 and a second, parallel intermediate bottom 90 arranged below the first one.

Subsequently, the circulating air flows downwards, passing through a first valve member 92 provided with a cylindrical two-way valve body, as indicated by a flow direction arrow 91. The valve member 92 is rotatable around a horizontal axis coincident with the longitudinal axis of the cylindrical valve body and is rotated into a position in which the first circulating air chamber 88 is in vertical flow connection with a second circulating air chamber 93. The latter is delimited by two parallel, vertical intermediate bottoms of the side wall 73. As indicated by the flow direction arrow 94, the circulating air leaves the second circulating air chamber 93, flows into the baking chamber 16 via a plurality of connecting ducts, which are arranged adjacent to the guiding rails 76, and circulates around the groups 20 of the receptacles 21 in particular. The pressure within the baking chamber 16 is limited by a vapour exhaust means 95 comprising a vapour exhaust duct 96, which leads out of the baking chamber and is bent upwards by 90° and which is closed by a vapour exhaust flap 97 as long as there is no excess pressure in the baking chamber 16.

Once the circulating air has circulated around the dough pieces 7 in the receptacles 21, it passes through connecting ducts, which are arranged in the opposite side wall 73a symmetrically to those provided in the side wall 73, as indicated by the flow direction arrows 98. The circulating air subsequently passes through a third circulating air chamber 99 in the side wall 73a, which is designed symmetrically to the second circulating air chamber 93, and flows upwards, towards a second valve member 100. Said second valve member 100 is designed in the same way as the first valve member 92, but turned by an angle of 90° relative to the latter, thus defining a horizontal flow connection for circulating air. As indicated by a flow direction arrow 101, the circulating air therefore flows from the third circulating air chamber 99 into a fourth circulating air chamber 102. The latter is delimited by the two valve members 92, 100 at its sides, by the second intermediate bottom 90 at its top and by a third intermediate bottom 103 at its bottom. Subsequently, the circulating air returns to the fan rotor 40 via the circulating air duct 57, as indicated by the flow direction arrows 104. There is a closed circulating air guiding channel 105 formed by the circulating air chambers 88, 93, 99, 102 in conjunction with the baking chamber 16.

In its position of rotation described above, the first valve member 92 seals the fourth circulating air chamber 102 arranged between the second intermediate bottom 90 and the third intermediate bottom 103, such that the circulating air flows back into the first circulating air chamber 88, as indicated by the flow direction arrow 104.

The valve members 92 and 100 are periodically switched from the first positions of rotation described above, in which the first flow path is open, to second positions of rotation, which are at an angle of 90° relative to the first positions of rotation and in which a second flow path is open, and vice versa. In the second flow path position, the first valve member 92 opens a horizontal passage and the second valve member 100 opens a vertical passage; as a result, the circulating air first flows from the first circulating air chamber 88 into the third circulating air chamber 99, subsequently passes through the baking chamber 16, the second circulating air chamber 93 and the fourth circulating air chamber 102 and finally is sucked back into the first circulating air chamber 88 by the fan rotor 40. As a result of these alternating flow paths, circulating air which has passed through the baking chamber 16 on a short route circulates around the dough pieces 7, which in FIG. 8 are arranged eccentrically relative to the vertical axis of symmetry of the two driving chains 71, 72, during e.g. half the circulation time, while circulating air which has passed through the baking chamber 16 on a longer route circulates around the dough pieces during the other half of the circulation time. In conjunction with the movement of the groups 20 of the receptacles 21 along the zigzag-shaped path portion 68, this ensures integrally comparable baking conditions for all dough pieces 7 regardless of the individual position of a dough piece 7 in the groups 20. As a result, each batch of dough pieces 7 arranged on the groups 20 is evenly baked.

Circulating air temperature gradients along the two flow paths are evened out in this way.

When switching from one flow path to the other, the valve members 92, 100 are rotated by means of a valve member driving motor 106. The latter is mounted on the first intermediate bottom 89 of the circulating air source housing 3 and drives transmission gearwheels 108, 109 via a driving belt 107. In FIG. 7, two transmission gearwheels 109 are arranged behind one another, each of which is allocated to a valve member 92, 100 via driving shafts 110.

Below a baking chamber bottom 111, two vaporization modules 112, 113 are arranged, which are supported on the baking chamber housing 4. Said modules produce water vapour which can be used to moisturize the dough pieces 7 in the baking chamber 16 in a controlled manner during the baking process.

The baking oven 1 embodied according to FIGS. 6 to 8 is operated as follows: In a first step, which is controlled by the driving motor 70, a group 20 is moved into a filling position below the lower end of the feeding passage 64. The receptacles 21 of this group 20 are then filled via the feeding passage 64. Subsequently, the driving chains 71, 72 are periodically driven, as indicated by a direction arrow 114 in FIG. 7, until the next group 20 is positioned below the end of the feeding passage 64. This group 20 is then filled. The aforedescribed process is repeated periodically until all groups 20 have been filled. Subsequently, the dough pieces 7 in the receptacles 21 are baked while being moved along the motion path 67. Once the baking process is finished, which may be e.g. after 12 to 15 minutes, the retaining bolt 82 is introduced in the baking chamber 16 by the actuator 81. The groups 20 passing by the retaining bolt 82 are pivoted by the latter around their rotation axis 25 until the dough pieces 7 contained in the respective group fall out of the receptacles 21. The dough pieces 7 then fall into the container 86 for readybaked dough pieces via the discharge passage 83 and the open discharge door 86.

The baking process, especially the fan rotor 40, the driving motor 70, the retaining means 80, the valve members 92, 100 and the vaporization modules 112, 113, is/are controlled by a central control unit (not shown) of the baking oven 1 according to a baking program.

In the baking program, the following parameters can be adjusted for each baking process: the temperature, the amount of vapour to be used for vapour treatment, the baking time, the speed (rpm) of the driving shaft 33, 75 during the baking process, the speed (rpm) of the fan rotor 40 and, if appropriate, the number of dough pieces 7 per receptacle.

In addition, the aforedescribed embodiments can comprise a vacuum pump which is connected to the baking chamber and can be activated in a controlled manner in order to produce a predetermined negative pressure in the baking chamber 16.

The vacuum pump can be activated at the beginning of the baking process in order to heat up the baking chamber 16 more rapidly.

Figure 9:
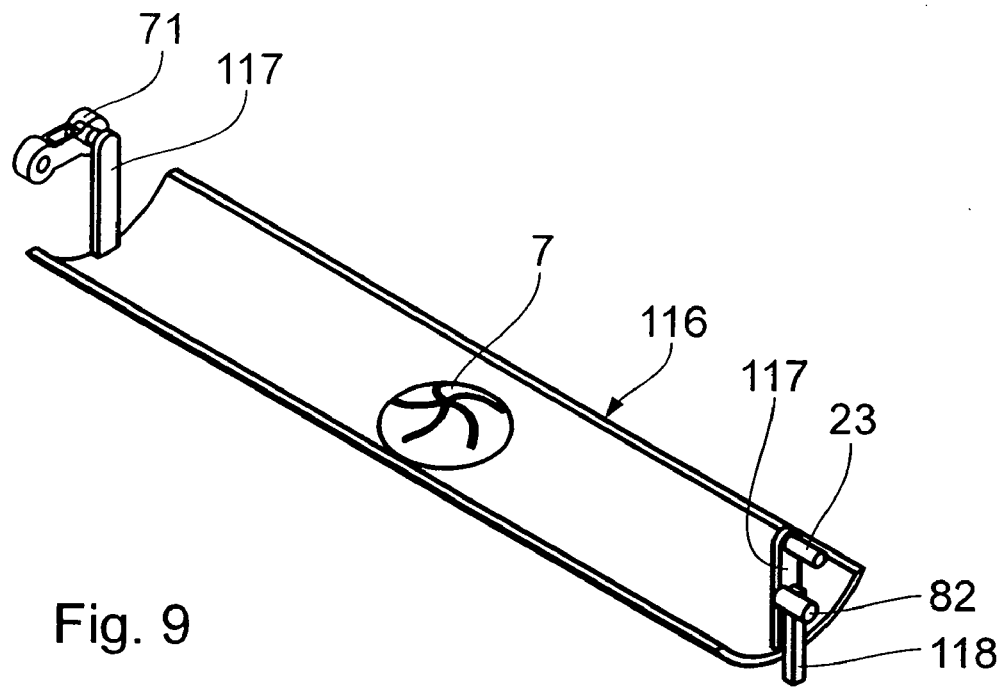
FIG. 9 shows a perspective view of a receptacle of the baking oven according to FIGS. 6 to 8.
Figure 10:
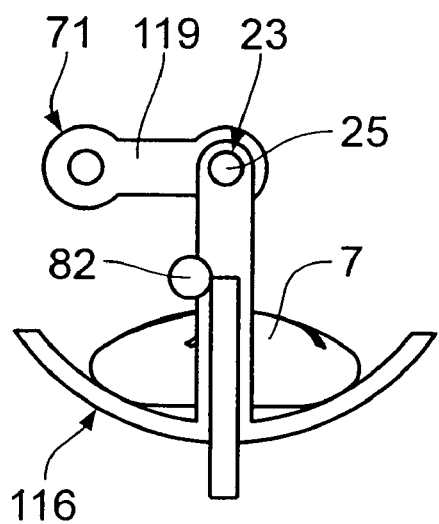
FIGS. 10 and 11 show momentary positions assumed when the receptacle according to claim 9 is emptied.
Figure 11:
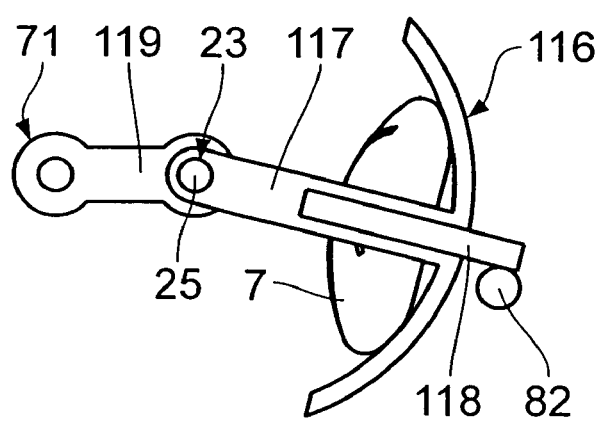

FIGS. 9 to 11 show an alternative way of holding the dough pieces 7 on a suspended support instead of the groups 20 of the embodiments according to FIGS. 1 to 8. Components corresponding to those discussed in connection with FIG. 4 in particular have the same reference numerals and will not be explained in detail again.

The receptacle used in the suspended support according to FIGS. 9 to 11 is a holding trough 116 whose length corresponds to that of a group 20. The holding trough 116 holds five dough pieces 7. At its two side ends, the holding trough 116 is connected to the bearing pins of the axial-radial bearings 23 via upright connecting rods 117. The bearing pin of the axial-radial bearing 23 is in engagement with a bearing support of a chain link 119 of the driving chain 71 or 72. The length of the connecting rods 117 is such that the rotation axis 25 of the holding trough 116 is located higher than the centre of gravity of the holding trough 116 even if the latter is filled with dough pieces 7. A retaining rod 118 is attached to one of the connecting rods 117 on the side thereof which is located opposite of the holding trough 116, which retaining rod 118 is fixed with respect to the holding trough 116 and extends downwards, parallel to the connecting rod 117 and beyond the bottom of the holding trough 116.

The retaining rod 118 interacts with the retaining bolt 82 (cf. FIG. 8). Said interaction will now be explained with reference to FIGS. 10 to 11, which show momentary positions of a holding trough 116 pivoted by means of the retaining bolt 82 which has been introduced in the baking chamber. FIG. 10 shows the position in which the retaining rod 118 has just come into contact with the retaining bolt 82 during the movement of the group 20 along the motion path 67.

During further movement of the driving chains 71, 72, the holding trough 116 is pivoted around the rotation axis 25 defined by the axial-radial bearings 23 while the retaining bolt 82 slides along the retaining rod 118. A final pivot position of the aforedescribed retaining process is shown in FIG. 11. In this position, the holding trough 116 is pivoted around the rotation axis 25 of the axial-radial bearings 23 in an anti-clockwise direction to such a degree that the dough pieces 7 fall out of the holding trough 116 into the discharge passage 83. During further movement of the holding trough 116, the retaining rod 118 slides off the retaining bolt 82 and, as a result, the holding troughs 116 return to the position shown in FIG. 10.

What is claimed is:

1. A baking oven (1) comprising
    a feeding portion having a feeding aperture (10; 61) for introducing dough pieces (7),
    a baking chamber (16) comprising at least one receptacle (21; 116) for dough pieces (7),
    a discharge portion having a discharge aperture (35; 84) for removing dough pieces (7)
    a circulating air unit comprising:
        a circulating air source (40) generating a circulating air flow,
        a circulating air heating means (41),
        a circulating air guiding channel (58; 105) a part of which is formed by the baking chamber (16),
    a plurality of receptacles (21; 116) for dough pieces (7), which receptacles (21; 116) are mounted in the baking chamber (16) to be freely rotatable or pivotable around a horizontal rotation or pivot axis (25) such that the rotation or pivot axis (25) of the receptacles (21; 116) is located higher than the centre of gravity of the receptacles (21; 116) even if the receptacles (21; 116) are filled with dough pieces (7),
    wherein a closable dough piece opening (14) for dough pieces (7) is arranged in a rotatable outer delimiting wall (15) of the baking chamber (16), which dough piece opening (14) interacts with either the feeding aperture (10) or the discharge aperture (35) for introducing or removing dough pieces (7), depending on the position of rotation of the outer delimiting wall (15).

2. A baking oven according to claim 1, comprising a drive unit (33; 70) by means of which the at least one receptacle (21; 116) is moveable within the baking chamber (16).

3. A baking oven according to claim 1, comprising a plurality of receptacles (21) for one dough piece (7) each.

4. A baking oven according to claim 1, wherein several of the receptacles (21) are rigidly interconnected to a group (20) and mounted such that they are jointly rotatable.

5. A baking oven according to claim 1, comprising a plurality of receptacles (116) for a plurality of dough pieces (7) each, wherein each receptacle (116) is rotatably or pivotally mounted.

6. A baking oven according to claim 1, comprising a vacuum pump which is connected to the baking chamber (16) and can be activated in a controlled manner in order to realize a predetermined negative pressure in the baking chamber (16).

7. A baking oven according to claim 2, wherein the drive unit (33) is designed such that it causes the at least one receptacle (21) to rotate around a horizontal rotation axis (17).

8. A baking oven according to claim 1, wherein an outer delimiting wall (15) of the baking chamber (16) is provided with circulating air openings (28).

9. A baking oven according to claim 1, comprising a baking oven feeding door (11) which is moveable by means of an actuator (13) between a baking position, in which the feeding portion is closed by the baking oven feeding door (11), and a feeding position, in which dough pieces (7) can be introduced via the feeding portion.

10. A baking oven according to claim 1, wherein a baking chamber feeding door (11), a baking chamber discharge door (36) and a dough piece opening (14) are designed such that they can be moved in a controlled manner.

11. A baking oven according to claim 2, wherein the drive unit (70) interacts with at least one flexible, continuous driveline (71, 72) to which the receptacles (21; 116) are attached, which driveline (71, 72)
   is guided by means of a guide means (66) and
   driven by means of the drive unit (70) such
      that it circulates along a closed path (67), thus moving along the receptacles (21; 116).

12. A baking oven according to claim 11, wherein the driveline (71, 72) is designed as a driving chain which is engaged by a driving pinion (74) of the drive unit (70).

13. A baking oven according to claim 11, wherein the receptacles (21; 116) are mounted between a pair of circulating drivelines (71, 72) which are guided symmetrically to one another, wherein at least one of the drivelines (71, 72) is driven.

14. A baking oven according to claim 11, wherein the guide means (66) comprises a plurality of deflection pulleys (79) for the at least one driveline (71, 72).

15. A baking oven according to claim 1, comprising a retaining means (80) for pivoting the receptacles (21; 116) around their rotation or pivot axis (25).

16. A baking oven according to claim 3, wherein each receptacle (21) comprises a holding basket (22) which is rotatably or pivotally mounted and open at one side.

17. A baking oven according to claim 4, wherein the group (20) of receptacles (21) comprises a common supporting frame (26) for receiving the holding baskets (22) of the group (20), which supporting frame (26) is pivotally mounted.

18. A baking oven according to claim 17, wherein the supporting frame (26) is made of aluminum.

19. A baking oven according to claim 1, comprising a vaporization means (112, 113) which is connected to the baking chamber (16) and can be activated in a controlled manner in order to supply vapour into the baking chamber (16).

20. A baking oven according to claim 1, wherein an inner delimiting wall (18) of the baking chamber (16) is provided with circulating air openings (28).

21. A baking oven according to claim 1, wherein the receptacles (21) are arranged between an outer (15) and an inner (18) delimiting wall of the baking chamber (16).

22. A baking oven according to claim 9, wherein the baking oven feeding door (11) is arranged above the baking chamber (16).

23. A baking oven according to claim 1, comprising a baking oven discharge door (36) which is moveable by means of an actuator (38) between a baking position, in which the discharge portion is closed by the baking oven discharge door (36), and a discharge position, in which dough pieces (7) can be removed via the discharge portion.

24. A baking oven according to claim 23, wherein the baking oven discharge door (36) is arranged below the baking chamber (16).

25. A baking oven according to claim 11, wherein the guide means (66) comprises a plurality of guiding rails (76) for the at least one driveline (71, 72).

26. A baking oven according to claim 16, wherein the retaining means (80) comprises a retaining bolt (82)
   which is introducable into a retaining position, and retractable into an inoperative position in a controlled manner and
   in the retaining position, interacts with a counterpart (118) of the receptacle (21; 116) for pivoting the receptacle (21; 116) and
   in the inoperative position, does not interfere with the motion path (67) of the counterpart (118) during the movement of the receptacles (21; 116).

* * * * *